Jan. 22, 1946.  T. J. DENNING  2,393,299
MANURE LOADER
Filed Dec. 12, 1944   3 Sheets-Sheet 1
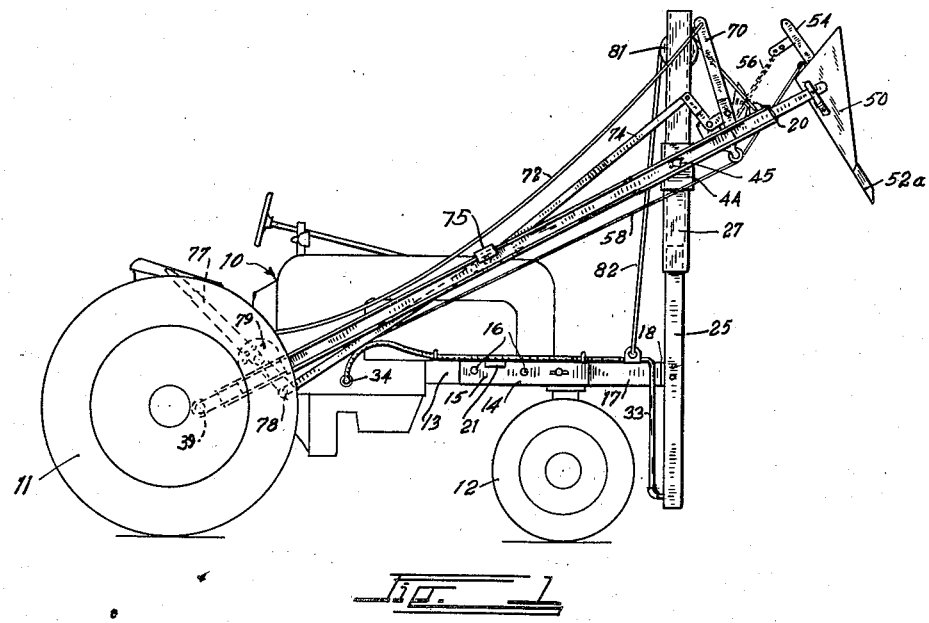
INVENTOR.
THOMAS J. DENNING.
BY
Martin E. Anderson
ATTORNEY.

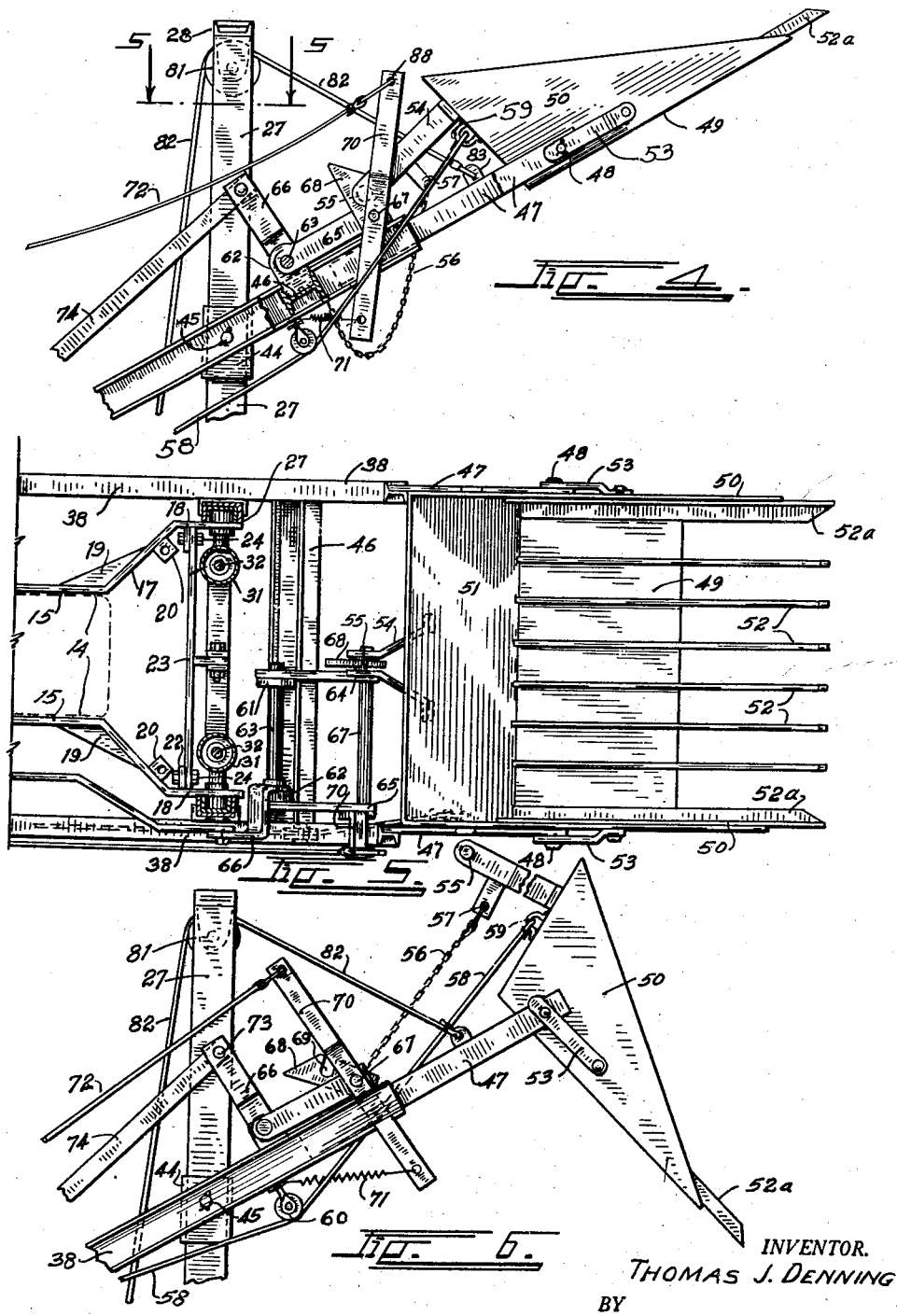

Jan. 22, 1946. T. J. DENNING 2,393,299
MANURE LOADER
Filed Dec. 12, 1944 3 Sheets-Sheet 3

INVENTOR.
THOMAS J. DENNING.
BY
ATTORNEY.

Patented Jan. 22, 1946

2,393,299

UNITED STATES PATENT OFFICE 2,393,299

MANURE LOADER

Thomas J. Denning, Hudson, Colo.

Application December 12, 1944, Serial No. 567,832

3 Claims. (Cl. 214—139)

This invention relates to improvements in power shovels.

Since the advent of the gasoline tractor, inventors have found that various attachments can be provided so as to employ power from the tractor for various purposes.

It is the object of this invention to produce an attachment for a farm tractor by means of which material such as dirt or manure or any other material can be loaded onto trucks and transported.

Another object of the invention is to produce an attachment for the purpose specified which shall be of a simple and substantial construction and which can be readily attached to or removed from a tractor.

A further object of the invention is to produce a power shovel attachment of a comparatively low height so that the tractor with the attachment can be readily run into and out of a machine shed.

Another object of the invention is to produce a machine of the type specified in which manual means is provided for adjusting the angular relation of the shovel with respect to the ground and with respect to the lifting arms.

A further object of the invention is to produce a machine of the type specified in which means is provided for automatically changing the angular relation of the shovel or load carrying device with respect to the lifting arms as the latter are raised and lowered about pivots.

A further object of the invention is to produce a device in which the operation is effected by a hydraulic mechanism that receives its power from the power pump which forms a part of the tractor.

A further object of the invention is to produce a machine in which the extension frame comprising guide members and a U-frame are automatically lubricated as the machine operates.

The above and other objects that may become apparent as this description proceeds are attained by means of a construction and an arrangement of parts that will now be described in detail and for this purpose reference will be had to the accompanying drawings in which the invention has been illustrated in its preferred form, and in which:

Figure 1 is a side elevation showing the mechanism applied to a tractor and shows the parts in elevated position;

Figure 2 is a side elevation similar to that shown in Figure 1, but shows the parts in their lowermost position;

Figure 3 is a front elevation;

Figure 4 is a fragmentary side elevation to a larger scale showing the parts in their uppermost position;

Figure 5 is a top plan view of the parts shown in Figure 4, a portion being shown in section taken on line 5—5, Figure 4;

Figure 6 is a side elevation similar to that shown in Figure 4, but shows the parts in dumping position;

Figure 7 is a fragmentary side elevation showing a slightly modified form of construction;

Figure 8 is a section taken on line 8—8, Figure 7;

Figure 9 is a side elevation of the pivoted end of lifting arm showing the telescopic connection; and Figure 10 is a top plan of the construction shown in Figure 9 with parts thereof broken away.

In the drawings reference numeral 10 designates a farm tractor; the rear wheels have been designated by reference numerals 11 and the front wheels by reference numerals 12. The frame of the tractor has been designated by reference numeral 13.

The tractor is of a well known make and has been illustrated merely to show the relationship of the other parts thereto.

The invention to which the application relates consists of an attachment having a bracket comprising two substantially identical members 14, one of which is a right and the other a left. These brackets have portions 15 that extend rearwardly along the frame 13 and which are secured thereto by bolts 16.

Referring now more particularly to Figure 5, it will be seen that brackets 14 comprise the straight portions 15 and outwardly inclined portions 17 that terminate in forwardly direct portions 18. Gusset plates 19 are positioned in the angle between the parts 15 and 17 so as to impart strength to the construction. Loops or eyelets 20 are provided on the inside of the angular arm 17 for a purpose which will hereinafter appear and similar eyelets or loops 21 are provided on the outside of arms 15, as shown in Figures 1 and 2.

Extending inwardly from the straight portions 18 are brackets 22 to which a tie rod 23 is secured by means of bolts or other equivalent means 24. Attached to the forwardly extending portions 18 are guide channels 25 which are preferably welded to the forwardly extending parts 18, but which may be secured thereto by bolts or any other suitable means. The guide channels are connected adjacent their tops by means of a transverse bar 26. A lifter frame of U-shape comprising side channels 27 and a transverse base channel 28 are telescopically connected with the vertical guides in a manner shown in Figure 3. Extending inwardly from the guides 25 are lugs or trunnions 28' whose inner ends are connected with a bracket 29 which is connected to and extends forwardly from the transverse bar 23 by means of braces 30, as shown in Figure 3. Hydraulic cylinders 31 have their lower ends pivoted to the trunnions 28' and are provided with pistons and with piston rods 32, the latter being connected with the transverse frame member 28. When oil or other fluid under pressure is admitted to the lower ends of the cylinders, for which purpose a fluid pressure line 33 extends from the cylinders to the outlet port 34 of the high pressure pump with which the tractor is provided, the piston and piston rods will move upwardly thereby moving U-frame upwardly from the position shown in Figure 2 to that shown in Figure 1. The lower ends of the vertical frame members 27 are interconnected by a tie rod 35 as shown in Figure 3. This tie rod, together with the frame member 28 resists spreading of the frame.

In addition to the tie rod 35, the U-frame is further braced by means of two diagonal bars 36 which connect the side members 27 with the transverse member 28. The upper cylinder cap of each cylinder has a pipe 37 secured in an opening therein, and this extends to the inner surface of frame members 27 and serves to conduct oil from the upper surface of the pistons to contacting surfaces of the guides and frame members so as to secure automatic lubrication.

A lifting arm or boom 38 is positioned on each side of the tractor and the rear ends of these arms are mounted for movement about pivots 39 that are secured to the tractor at a point adjacent the rear axle thereof.

Referring now to Figures 9 and 10, it will be observed that the pivot 39 extends through a projecting portion 40 of a bracket 41 that is secured to the tractor by bolts or other suitable means. Arms 38 are I-beams and in the channels adjacent the inner ends are positioned two plates 42 that are held in position by transverse bars 43 so as to be slidable with respect to the liffting arms whereby the latter will telescope in a manner and for a purpose that will hereafter appear. Secured to the lifting arms at a point adjacent their free ends are guides 44 that are formed from short pieces of channel iron. These are attached to the arms by means of pivots 45, and are slidable along the frame members 27. Extending between the free ends of the lifting arms 38 is an I-beam 46 which is shown most clearly in Figures 4 and 5. This I-beam maintains the lifting arms in spaced relation. Secured to the free ends of the lifting arms and positioned in the outer channels are flat bars 47 which are preferably welded to the arms, but which may be attached to them by bolts or rivets. A load carrying device or shovel is attached to the outer ends of bars 47 by means of pivots 48. This shovel or bucket is constructed in any suitable manner to fit the particular purpose for which it is employed, but in the embodiment shown it consists of a bottom 49 and two triangular sides 50. A back 51 is welded to the ends of the sides and is preferably inclined to the bottom as shown in Figures 4 and 6. Teeth or prongs 52 are welded or otherwise secured to the bottom 49 in spaced relation so as to form an assembly like that shown in Figure 5. The outer teeth are preferably angle irons and have been designated by reference character 52a. Straps 53 serve to reenforce the pivots 48. Secured to the end plate 51 and extending rearwardly is a bracket 54 comprising two similar members spaced apart and connected together by means of a pin 55, as shown in Figure 5. A chain 56 has one end attached to a loop or projection 57 on the bracket 54 and has the other end connected with the I-beam 46 as shown in Figure 4. The chain forms a stop that limits the tilting of the shovel as shown in Figure 6. A cable 58 is connected to the back 51 of the shovel by means of a loop 59 and then extends rearwardly passing over the pulley 60 from whence it proceeds to a point adjacent the operator. When the operator wants to bring the shovel back into operative position, he can do so by exerting a pull on cable 58.

The latch mechanism, by means of which the shovel is held in operative position, will now be described. This latch mechanism comprises two bearings 61 and 62 that are positioned in the I-beam 46 to which they are secured by welding. A shaft 63 is journaled in these bearings. Two crank arms 64 and 65 are nonrotatably connected with the ends of shaft 63 in the manner shown in Figure 5. Another crank arm which has been designated by reference numeral 66, is nonrotatably connected with the shaft and is offset outwardly in the manner shown in Figure 5 so that its free end is positioned over the corresponding lifting arm. Journaled in bearings in the free ends of the crank arms 64 and 65 is a shaft 67. This shaft terminates approximately at the middle point between the lifting arms and has welded or otherwise secured thereto, a latching pawl 68 that is provided with a notch 69 which is shown most clearly in Figure 6. This notch is positioned to engage the pin 55 when the shovel is in operative position, as shown in Figures 4 and 5. A crank arm 70 is nonrotatably connected with the shaft 67 and extends to both sides of the shaft as shown in Figure 6. A spring 71 connects the lower end of the crank 70 with the corresponding lifting arm and this spring is tensioned so that it will exert a force tending to rotate the pawl in a clockwise direction when viewed as in Figure 6. A cable 72 is attached to the upper end of the crank arm 70 and extends rearwardly to a position within easy reach of the operator. When tension is exerted on the cable 72, the arm 70, together with the shaft 67 and pawl 68 are rotated in a counterclockwise direction so as to release the latch allowing the shovel or bucket to tilt in a clockwise direction to a position like that shown in Figure 6, which permits the load to be dumped onto a truck or any other place. The free end of the crank arm 66 is connected by means of a pivot 73 with a link 74. This link is pivoted to a slide 75 that is carried by the corresponding lifting arm. Another link 76 is also connected to the slide 75 by the same pivot and its rear end is connected to the lower end of the lever 77 by means of a pivot 78 suitable means is provided for holding the lever in adjusted position comprising a quadrant or other suitable means which has been shown in dotted lines as indicated by reference numeral 79. It will be seen that by adjusting the lever 77 about its pivot 80, the slide 75 can be moved either forwardly or rearwardly along the lifting arm and this motion transmitted to the crank arm 66 imparts a corresponding rotation to the shaft 63 which, in turn, moves the crank arms 64 and 65 in a corresponding angular direction, thereby raising and lowering the shaft 67. This raises and lowers the pawl 68 and imparts a corresponding rotary movement to the shovel, thereby making it possible for the operator to adjust the tilt of the shovel so as to obtain the most suitable angular relation with the ground during the operation of filling the shovel. This manual means for adjusting the shovel is of great importance during the operation of the machine.

In addition to the manual means just described for tilting the shovel or load carrying device, an automatic means for changing the angular relation of the shovel to the lifting arms as the latter are raised has also been provided. It has already been explained that the lifting arms have a telescopic connection with the pivots 39 and since they are connected with the slides 44 by means of pivots 45, they will move upwardly along a straight line and the distance between the pivots 39 and 45 will therefore represent the diagonal of a rightangle triangle and this diagonal varies in length with the position of the arms below or above a horizontal plane passing through the pivots 39. When the arms are in the position shown in Figure 1, the distance between pivots 39 and 45 is a maximum. The quadrant 79 and the pivot 80 are secured to the tractor and not to the lifting arm and therefore when the distance between pivots 39 and 45 increases due to the upward movement of pivot 45, it is evident that slide 75 will move rearwardly along the lifting arm and this will impart a counterclockwise movement to the crank arm 76 which, in turn, will impart a corresponding upward movement to the pawl 68 permitting the shovel to tilt about pivot 48 in a clockwise direction. The object of this automatic tilting movement is to maintain the bottom 49 of a shovel somewhat parallel to the position shown in Figure 2. Although this movement is desirable, it may be dispensed with and such tilting movement of the shovel obtained by operation of the manual adjusting means.

In the above parts of the specification, it has been described how the U-shaped frame comprising the members 27 is moved upwardly by operation of the hydraulic jacks comprising the cylinders 31. The manner in which this motion is transmitted to the lifting arms will now be described.

Referring to Figure 3, it will be observed that two pulleys 81 are connected with the transverse bar 28 by means of suitable brackets as shown. The two cables 82 are each connected with a bracket 20, passes over a pulley 81 and have their other ends connected with the corresponding lifting arm at a point 83. Since the anchor 20 is stationary, it follows that when the U-shaped frame is moved upwardly, the connecting point 83 will move upwardly at a rate substantially twice as great as that of the pulleys that are connected with the lifting frame. It follows from this that when the lifting frame is extended in an upward direction, the slides 44 will move upwardly along the sides 27. There is, therefore, a relative movement between the lifting arms and the U-shaped lifting frame as the latter is reciprocated by means of the hydraulic mechanism.

Special attention is directed at this point to the fact that the guides 25 are positioned on the inside of side members 27, as by this means it is possible to obtain a sliding connection between the slides 44 and the frame members 27 during the lifting and lowering of the lifting frames and the shovel.

It is customary to provide tractors with high pressure pumps by means of which a pressure reaching as high as 800 pounds per square inch or more can be obtained. Such pumps are provided with automatic means for disconnecting the pressure operated mechanism whenever the pressure exceeds a certain amount. Whenever the pistons reach the top of the cylinders 31, the release mechanism operates and prevents the further increase of pressure and at the same time the automatic valve in the pressure pump operates to prevent the fluid from returning until the operator opens the return valve. These automatic valves and the return valve have not been shown because they are present in all tractors that are provided with high pressure pumps.

In the above description and in Figures 1 to 6, a machine has been described and shown in which the arms 38 increase in length when they move either upwardly or downwardly beyond a horizontal plane passing through the pivot 39. In Figure 7, a modified construction has been shown in which the arms are not extensible and in which they are connected with the slides 44 by means of slides relative to which the arms may move longitudinally. This construction results in a somewhat simpler mechanism than the one above connected.

Referring now to Figures 7 and 8, it will be observed that the pivot 39 extends through a bearing in the end of the lifting arm 38 and that the quadrant 79 is secured to the lifting arm instead of to the tractor. The crank arm 66 extends downwardly and has been designated as 66a. A lever 85 is pivoted at 86 to the slide 84. The lower end of lever 85 is connected with the lower end of crank arm 66a by means of a connecting rod 87. The lever 77 is connected by means of a link 76a to the pivot 88 at the upper end of link 85. It will now be apparent that whenever the operator turns the lever 77 about its pivot, lever 85 will be given a corresponding rotation and this will be imparted to the crank arm 66 and to shaft 63 so as to effect an adjustment of the pawl 68 in the same manner and for the same purpose as by the mechanism above described. It will also be evident from an inspection of Figure 7, that whenever the lifting arms are moved upwardly or downwardly about their pivots, the slide 84 will follow the direction of the frame members 27, thereby altering the distance between the pivot 86 and the shaft 63 and this will produce a corresponding rotation of the crank arm 66a and shaft 63 with its attached parts in such a manner as to effect an automatic tilting of the bucket during the raising and lowering of the same.

Having described the invention what is claimed as new is:

1. A power loader comprising, in combination, a bracket for attachment, in a horizontal position, to the front end of a tractor, a frame comprising two spaced guide members secured to and extending upwardly from the bracket, a U-shaped frame connected with the outer surfaces of the guide members for movement therealong, the base of the U-frame being at the top, means comprising a hydraulic jack assembly interconnecting the U-frame with the guides to move the U-frame along the guides, lifter arms having one end provided with means for effecting a pivotal connection with the tractor, the arms being positioned closely adjacent and slidable relative to the U-frame, means for moving the lifting arms along the U-frame whenever the U-frame moves along the guides, in the same direction, and at a rate greater than that at which the U-frame moves along the guides, a load carrying device pivotally connected with the free ends of the lifting arms, a latch device for holding the load carrying device in operative position, and manually operable means for releasing the latch.

2. A power loader adapted to be mounted on a tractor, lifting arms mounted on the sides of the tractor for movement about a pivot positioned adjacent the rear axle, a load carrying device pivoted to the free ends of the lifting arms, a pair of spaced upwardly extending guides at the front end of the tractor, a substantially U-shaped lifting frame embracing the guides for longitudinal movement therealong, the base of the U-frame being at the top, two pulleys connected with the base, a cable for each arm, one end of each cable being connected with the tractor and the other end with an arm, the bight passing around a pulley, hydraulic means for moving the lifting frame along the guides, a latch adjustably connected with the lifting arms for holding the load carrying device in operative position, manually operable means for releasing the latch and means responsive to the angular movement of the arms about their pivots for adjusting the position of the latch to effect an angular adjustment of the load carrying device relative to the lifting arms.

3. In a power loader mounted on a tractor, lifting arms positioned on opposite sides of the tractor and mounted on pivots adjacent the rear tractor axle, means for raising and lowering the free ends of the lifting arms comprising two spaced and interconnected guides secured to the front end of the tractor and extending upwardly, a frame of substantially U-shape connected with and slidably movable along the outside of the guides, the base of the U-frame being at the top, hydraulic means for moving the U-frame along the guides, a cable for each arm, having one end connected with an arm the other connected with the tractor and the bight passing around a pulley carried by the lifting frame, whereby the arms will move in the same direction as the U-frame and at a greater speed, the sides of the U-frame serving as means for guiding the arms laterally, a load carrying device mounted on the forward ends of the arms for tilting movement about a pivot, a latch for holding the load carrying device in operative position, manually operable means for releasing the latch, and means for automatically adjusting the position of the latch as the lifting arms are raised to effect an angular adjustment of the load carrying device relative to the arms.

THOMAS J. DENNING.